Aug. 23, 1932. P. R. HINES 1,873,889

METHOD FOR THE PREPARATION OF CHROMIUM TRIOXIDE

Filed June 26, 1929

Inventor
Paul R. Hines
By Fay Oberlin & Fay
Attorneys

Patented Aug. 23, 1932

1,873,889

UNITED STATES PATENT OFFICE

PAUL R. HINES, OF ELYRIA, OHIO, ASSIGNOR TO THE HARSHAW CHEMICAL COMPANY, OF CLEVELAND, OHIO, A CORPORATION OF OHIO

METHOD FOR THE PREPARATION OF CHROMIUM TRIOXIDE

Application filed June 26, 1929. Serial No. 373,761.

This invention relates to chemical manufacture; and more particularly where molten products are formed, involving difficulties in separation and further handling, as for example in the manufacture of chromium trioxide, and similar reactions; and it is among the objects of the invention to provide improved procedure and apparatus for conducting the reactions and handling the products. Other objects and advantages will appear as the description proceeds.

To the accomplishment of the foregoing and related ends, the invention, then, consists of the features hereinafter fully described, and particularly pointed out in the claims, the following description and the annexed drawing setting forth in detail certain illustrative embodiments of the invention, these being exemplary however of but a few of the various ways in which the principle of the invention may be employed.

In said annexed drawing:—

Figure 1:
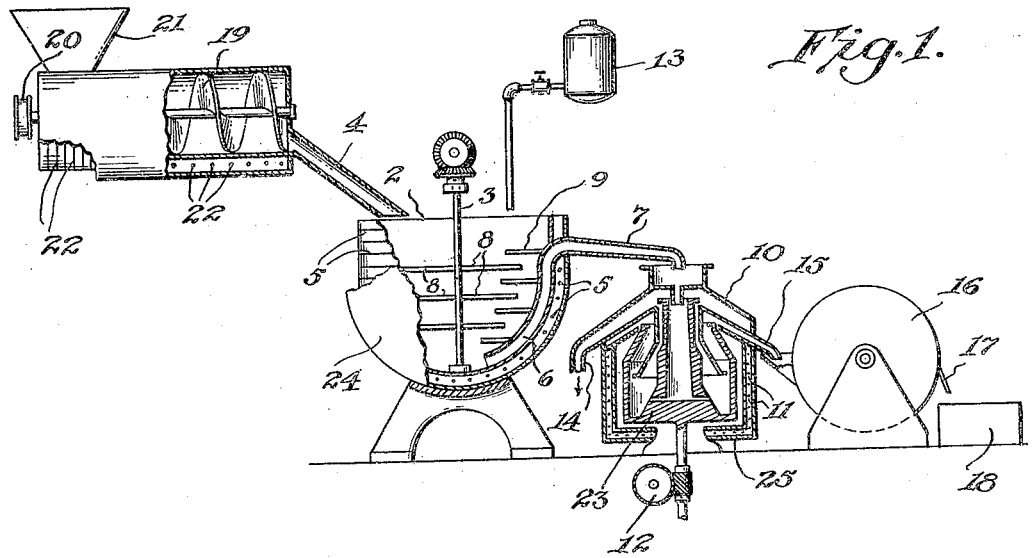
Figure 2:
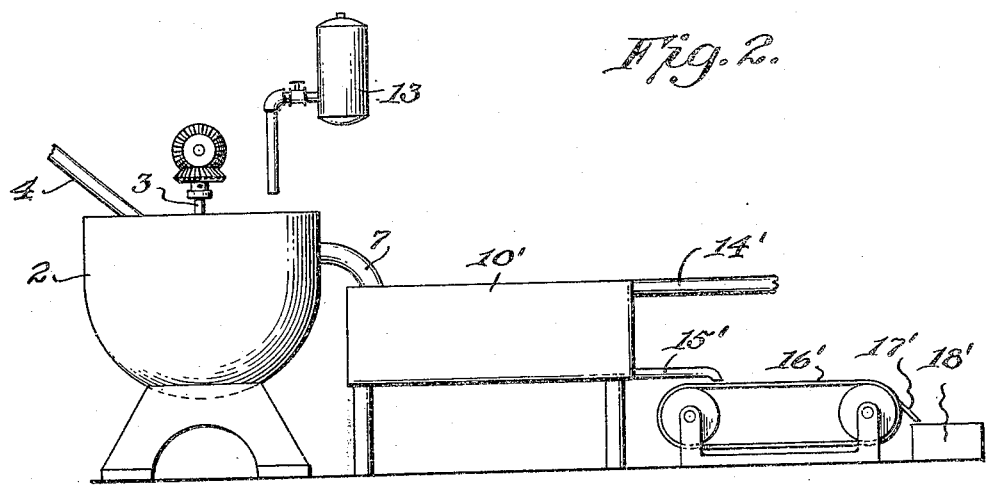

Fig. 1 is a side elevation, with parts in section, of apparatus contemplated; and Fig. 2 is a similar view of a modification.

Referring more particularly to the drawing, there is shown a reaction vessel 2 having a stirring shaft 3 with arms 8, there preferably being baffle arms 9 on the interior of the vessel also. The stirring shaft may be driven by any suitable means, as for instance bevel gearing, from a power drive shaft. About the vessel heating means is arranged, preferably electric heating elements, as for instance resistance elements 5, and heat insulation or lagging 24 envelopes the vessel so as to guard against heat loss. A supply chute 4 leads to the reaction vessel from a suitable source of supply, and a discharge, as for instance in the form of a duct 6 from the lower part of the vessel, proceeds as a discharge spout 7 to a separator arranged to separate molten products by differences of gravity.

As shown in Fig. 1, this is in the form of a centrifugal machine 10 having a bowl 23 driven by any suitable means, for instance through drive-gearing 12. About the bowl is a heat insulation jacket or lagging 25, and preferably also heat-supplying means, such for instance as electric resistance elements 11. From the bowl of the centrifuge an offtake spout 14 (shown broken away for convenience) is arranged to conduct a lighter molten product to any desired point, and an offtake spout 15 is suitably arranged to conduct off the heavier molten product.

In carrying out a reaction involving the formation of molten products, the molten mixture as forwarded from the reaction vessel is thus seen to be subjected to a separatory action, and the respective products are taken off to further points of disposal. In the case of reactions involving salts and acids as raw materials, the salt component may be fed from the supply chute 4, and the acid component from the container 13. In many instances it is desirable to previously dry the salt, or even preheat it to a proper extent. In such case, the material may be subjected in transit through the feeder to suitably applied heat. For instance, electric resistance elements 22 may afford a readily controllable source of such heat for the material as forwarded from hopper 21 by the conveyor worm 19, the latter being driven by suitable means, such as pulley 20. With the components introduced into the reaction vessel 2 and suitable agitation applied, reaction proceeds and the molten products flow out through the spout 7 to the centrifuge 10. By arranging the spout 7 and duct 6 to drain from the lower part of the reaction vessel, the reaction products may be drawn off free from admixture with any incoming material, and at the same time a constant level may be maintained in the vessel. In some instances, the heat of reaction itself is sufficient to meet all requirements, and the heat-insulation about the respective vessels is then sufficient to maintain the mass against premature heat loss, so that it may be further handled in molten form on through the separatory stage. Where required however, heat may be applied, either in a preliminary drying or heating in the feeder 21, or in the reaction vessel 2, or in the separator 10. From the separator, the lighter component flows off while yet molten through the conduit 14 to any suitable point of disposal, and the heavier component flows off through conduit 15. While still molten, it may then be subdivided, as by atomizing, or preferably by spreading upon a travelling surface, as a rotating drum 16 suitably cooled, the film solidifying thereon being removed by the scraper 17 as flakes which are collected by a receiver 18. Either or both molten products may be so treated.

In the same relation, instead of a centrifugal separator, in some instances a gravity separator on the lines of a receptacle 10' (Fig. 2), jacketed against heat loss, is arranged to receive the discharge of the spout 7 from the reaction vessel 2, the separator 10' being of a size to allow a quiet separation of the molten materials from the reaction vessel, and with stratification such that the lighter product flows off through conduit 14' to a suitable point of disposal and the heavier stratified product flows off through conduit 15'. One or both of these products may be then subdivided or flaked, and in the form illustrated in Fig. 2, the conduit 15' discharges onto a cooled travelling conveyor or band 16', the solidified film being thence scraped therefrom by knife 17', the flakes being received into the container 18'.

As a further more specific example, the procedure may be described for the manufacture of chromium trioxide: Sodium bichromate is supplied to hopper 21, and is fed along by the feed worm 19, while heat may be applied by the heating elements 22. If substantially anhydrous bichromate be employed, little or no heat will be necessary at this stage, or merely sufficient to dry out moisture. If however the hydrous or crystalline bichromate be employed, more heat may be desirably applied.

The reaction vessel 2 may be initially brought up to temperature by application of heat, and with the feed of the bichromate from the chute 4 and feed of strong sulphuric acid, preferably oleum, from supply vessel 13, the agitator is put into operation. If the bichromate as received into the reaction vessel is substantially anhydrous, and the acid is of strength not less than 98 per cent., and preferably fuming acid or oleum, the requirement of continuous application of external heat is obviated, and in such case it is merely desirable to initially bring the reaction vessel up to temperature and the heating current may then be shut off. Thus, the reaction vessel may be initially heated to 180°–210°, or preferably 193°–195° C., and the heat insulation will then further prevent loss to a material extent, and the reaction may proceed and the products remain molten until separated. Similarly, in starting up, it is desirable to raise the temperature of the separator to a point to insure against chilling of the molten product as introduced. With further operation however, the heat insulation may sustain the temperature to the required point. In some cases it is advantageous to apply heat to the acid, in addition to or instead of to the other component. Heated acid may thus facilitate the employment of hydrous bichromate. A convenient mode of heating the acid may be provided by electric heating elements or a jacket for steam or other heating fluid not shown. If water be introduced in one or more of the reaction components, there must be enough heat also introduced to drive off the water and bring the reaction products to molten condition. Heat given to either of the components, plus the heat of reaction should accordingly equal the requirements to drive off water introduced by either component and provide molten reaction products. In any case, the temperature may be readily controlled as necessitated to merely maintain the products molten until separated. With chromium trioxide for instance then flowing from the separator through the conduit 15 or 15', depending upon the particular apparatus, the travelling cooling surface picks up a film, which quickly solidifies, and the scraper then flakes it off into the receiver in finely divided or flaked form.

It will thus be seen that reactions involving molten mixed products, may be efficiently conducted, with or without supply of heat at any or all points, and with control to separate the products while yet molten. And at this point, such of the products as are desired in ultimately finely reduced solid form, may be atomized or be divided into flakes or granules, and the difficulties ordinarily incident to handling substances at an elevated temperature and in molten form are obviated, and in a manner conducing to continuous type operation as well.

Other modes of applying the principle of the invention may be employed, change being made as regards the details disclosed, provided the steps or means stated in any of the following claims, or the equivalent of such, be employed.

I therefore particularly point out and distinctly claim as my invention:—

1. The process of the character described, which comprises reacting, in a preheated zone, between oleum and a substantially anhydrous alkali metal compound of chromic acid, thereby obviating necessity of continuous external heating and exothermically forming molten products, and making a substantially clean separation of chromium trioxide from the rest of such molten products.

2. The process of the character described, which comprises reacting, in a preheated zone, between oleum and a substantially anhydrous alkali metal compound of chromic acid, thereby obviating necessity of continuous external heating and exothermically forming molten products, and making a substantially clean separation of chromium trioxide from the rest of such molten products by flowing the hot molten reaction product mixture through a zone in exposure to centrifugal action, thereby separating the chromium trioxide.

3. The process of the character described, which comprises reacting in a preheated zone, between oleum and an anhydrous alkali metal compound of chromic acid, thus exothermically forming molten products, and making a substantially clean separation of the chromium trioxide melt from the rest of such molten products, and then immediately flaking the chromium trioxide melt.

Signed by me this 20th day of June, 1929.

PAUL R. HINES.